Aug. 19, 1924.

A. H. STEBBINS

SEPARATOR

Filed Oct. 27, 1922

INVENTOR:
Albert H. Stebbins
BY Robt P. Harris,
ATTORNEY

Aug. 19, 1924.

A. H. STEBBINS 1,505,744

SEPARATOR

Filed Oct. 27, 1922   2 Sheets-Sheet 2

INVENTOR:
Albert H. Stebbins
BY
ATTORNEY

Patented Aug. 19, 1924.

1,505,744

UNITED STATES PATENT OFFICE.

ALBERT H. STEBBINS, OF LOS ANGELES, CALIFORNIA.

SEPARATOR.

Application filed October 27, 1922. Serial No. 597,377.

*To all whom it may concern:*

Be it known that I, ALBERT H. STEBBINS, a citizen of the United States, residing at Los Angeles, in the county of Los Angeles and State of California, have invented an Improvement in Separators, of which the following description, in connection with the accompanying drawings, is a specification, like characters on the drawings representing like parts.

The invention to be herein described relates to separators for removing liquid from a gaseous fluid in which it may be suspended.

The present invention is well adapted to treat natural gas as it comes from the wells to remove the oil, gasoline and other petroleum products therefrom, and the invention is also well adapted to remove moisture from steam or air, and for various other purposes.

One feature of the invention resides in a separator having apertured screens disposed therein so that the liquid within the gaseous fluid being treated will be deposited upon the screens.

A more specific feature of the invention resides in a separator having apertured screens disposed therein to form an annular chamber between the screens about which the gaseous fluid to be treated whirls, and the screens have lips extending away from the annular chamber and upon which the liquid within the gaseous fluid is deposited.

Other features of the invention and novel combination of parts in addition to the above will be hereinafter described in connection with the accompanying drawings which illustrate one good practical form thereof.

In the embodiment of the invention illustrated a container 10 is provided conveniently in the form of a drum and is supported in a standing position. The lower end of the drum or container 10 is closed as at 11 and forms a tank in which the liquid accumulates as it is removed from the gaseous fluid.

A tube 12 preferably extends longitudinally within the container 10 as shown and projects through the upper end 13 of the container, and the tube 12 may have apertures 14 formed therein about the tube and longitudinally thereof to permit fluid to pass from the container into the tube.

One or more apertured screens are mounted within the container 10 so that the gaseous fluid will pass through the screens and will deposit liquid thereupon, and the screens preferably extend around the tube 12 in spaced relation thereto.

Figure 1:
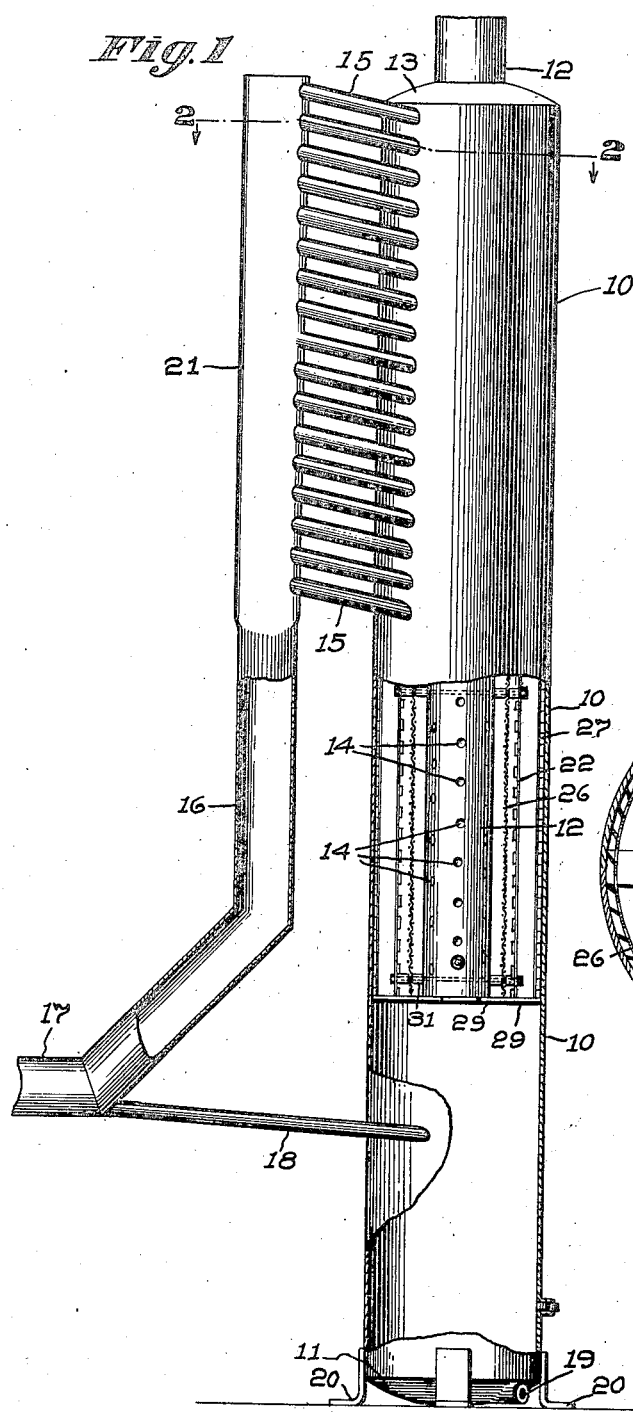
Fig. 1 is a side elevation with parts in section of a separator constructed in accordance with the present invention.

It is desirable that the gaseous fluid be delivered into the container with a whirling movement that will cause it to travel about the container and longitudinally thereof so that the liquid carried thereby will be thrown outwardly by centrifugal force, and to this end, in the present case, the fluid to be treated is delivered tangentially into the upper part of the container 10 by a number of pipes 15 leading from a conduit 16. The pipes 15 preferably slope downwardly somewhat as shown in Fig. 1, to impart a downward whirling movement to the fluid delivered thereby into the container, and a number of relatively small pipes 15 are preferable to one large pipe leading into the container, as the small pipes will deliver the fluid at a number of points lengthwise of the tank, and the fluid delivered by these small pipes will enter the container 10 at points near the outer wall thereof.

Figure 2:
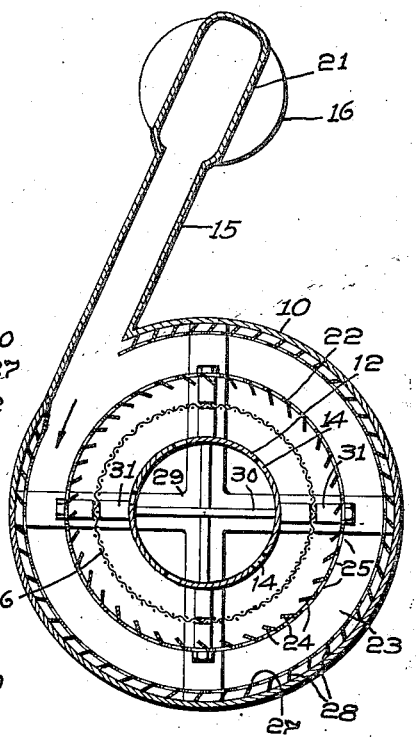
Fig. 2 is an enlarged sectional view taken on the line 2—2 of Fig. 1.

The conduit 16 may lead from any source of supply, and in the present case the portion 16 of the conduit extends upwardly from a horizontal portion 17. As a result of this arrangement some liquid may accumulate at the bend of the conduit, and this may be drained into the tank at the lower end of the container by a pipe 18. The liquid in the lower portion of the container may be removed through the opening 19, and the container 10 may be supported by feet 20. The portion of the conduit 16 from which the pipes 15 lead may be flattened somewhat as shown at 21, Fig. 2.

It is desirable that the container 10 be constructed to provide an annular chamber in which the fluid to be treated may whirl, and the walls of this annular chamber should be comparatively smooth so as not to unduly check the flow of the fluid in the annular chamber. Furthermore, since in the construction shown the fluid passes from the container 10 into the tube 12 through apertures in the wall of the tube, it is desirable to provide apertures in the inner wall forming the annular chamber so that the fluid may pass through this wall toward the tube 12.

Therefore in the construction shown the container 10 has an apertured screen 22 mounted therein about the tube 12 and in spaced relation to the wall of the container to form the annular chamber 23, and the apertured screen 22 preferably is formed of a perforated plate having a comparatively smooth outer surface and lips 24 extending inwardly from its inner surface. The gaseous fluid whirling about the annular chamber 23 will pass inwardly through the apertures 25 of the perforated plate 22 and will deposit liquid upon this plate and the lips 24, which liquid will trickle down the plate into the lower portion of the container 10.

It may be desirable to provide one or more apertured screens 26 between the screen 22 and the tube 12 upon which more of the liquid carried by the fluid may be deposited, and since the circular travel of the fluid is arrested before it reaches the screen 26 it is not important that this screen have a smooth outer surface and the same may therefore be constructed of wire mesh as shown.

It is desirable that a protected space be provided adjacent the inner wall of the container 10 in which the liquid thrown outwardly by centrifugal force may accumulate and run down toward the lower end of the container, and to this end in the construction shown the inner wall of the container is lined with an apertured screen 27 preferably consisting of a perforated plate having a comparatively smooth inner face, and lips 28 extending outward from the outer face to hold the screen 27 slightly spaced from the wall of the container. The screen 27, although desirable in most cases, is not an essential part of the present invention.

The tube 12 may be supported centrally within the casing 10 by one or more spiders 29, and the circular screens 26 and 22 may be held in spaced relation to the tube 12 by bolts 30 having sleeves 31 mounted thereupon.

Figure 3:
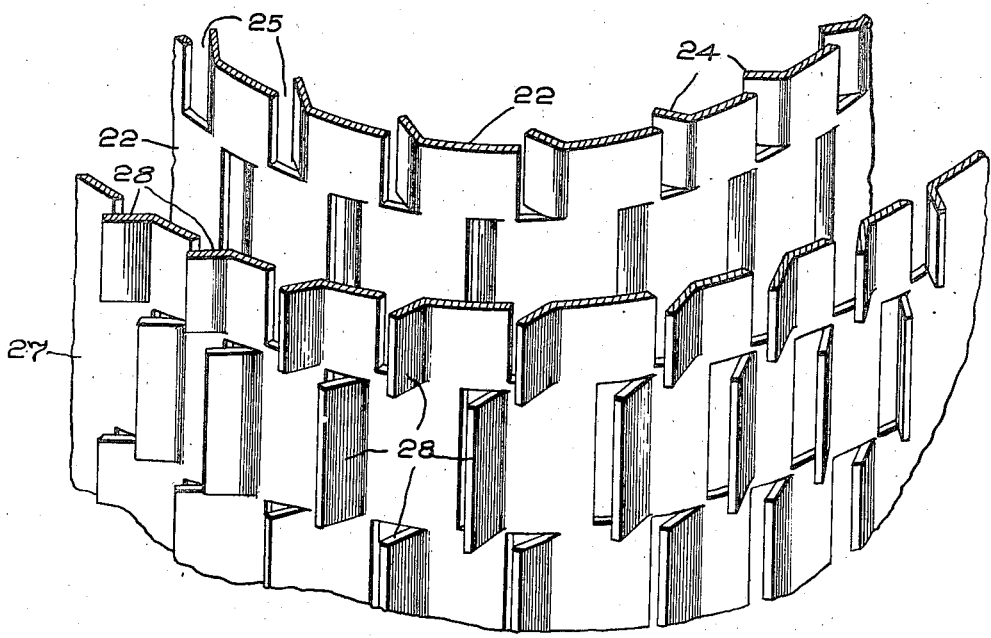
Fig. 3 is an enlarged perspective view of two of the apertured plates within the separator.
Figure 4:
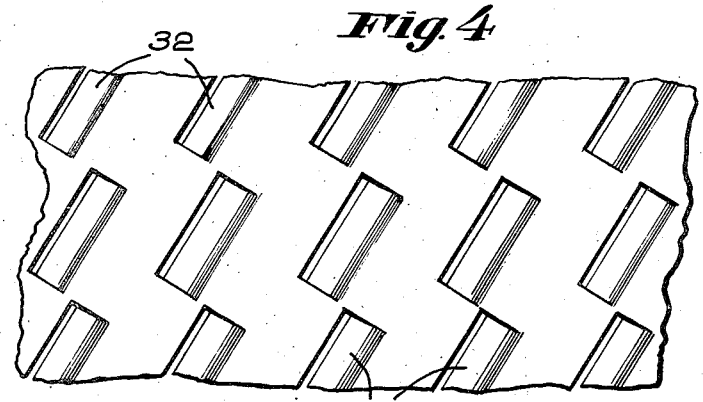
Fig. 4 is a side view of a modified construction of an apertured plate.

In some cases instead of forming the lips 24 and 28 so that they extend vertically, as best shown in Fig. 3, it may be desirable to form these lips so that they are inclined as designated by 32 in Fig. 4, since this will cause the liquid deposited upon the inclined lips to travel along the same toward the point where the lips join onto the plate.

The liquid within the fluid being treated which is not removed by the various screens will be deposited upon the tube 12 and pass downwardly along the same as the fluid enters the apertures 14, and the fluid within the tube will pass out of the same through the upper end thereof.

What is claimed is:

1. A separator for removing liquid from a gaseous fluid, comprising in combination, a container, a tube extending longitudinally within said container and having apertures for the passage of fluid from the container into the tube, a perforated plate surrounding the tube in spaced relation thereto and having a smooth outer surface and inwardly extending lips, means for delivering the gaseous fluid to be treated into the container with a whirling movement about the perforated plate so that the fluid may whirl freely in the space between the perforated plate and container and upon passing through the perforations toward the tube will deposit liquid upon said lips.

2. A separator for removing liquid from a gaseous fluid, comprising in combination, a container, a tube extending centrally within the container and having apertures for the passage of fluid from the container into the tube, a perforated plate forming a lining for the inner face of the container, a second perforated plate surrounding the tube and forming an annular space between the two plates, lips upon each of the plates and extending away from said annular space, and means for delivering the gaseous fluid to be treated into said annular space with a whirling movement to deposit liquid upon said lips.

3. A separator for removing liquid from a gaseous fluid, comprising in combination, a drum supported in a standing position, a tube mounted within the drum and having apertures for the passage of fluid from the drum into the tube, means for delivering the gaseous fluid to be treated into the drum with a whirling movement, including a plurality of pipes leading tangentially into the drum at different points lengthwise thereof, and an apertured screen surrounding the tube within the drum and adapted to arrest the liquid in the fluid as the latter passes about the container and through the screen to the tube.

4. A separator for removing liquid from a gaseous fluid, comprising in combination, a container, a tube extending longitudinally within said container and having apertures therein along its length for the passage of fluid from the container into the tube, a perforated plate surrounding the tube in spaced relation thereto and having lips extending from a face of the plate and at an inclination throughout their length, to provide the lips with inclined edges along which the liquid travels and means for delivering the gaseous fluid to be treated into the space between the perforated plate and container so that the fluid will pass through the apertures of said plate and deposit liquid upon said lips.

5. A separator for removing liquid from gaseous fluid, comprising in combination an upright drum, a tube mounted centrally within the drum to form an annular chamber within the drum and having apertures along its length for the passage of fluid therethrough, means for delivering the gaseous fluid to be treated tangentially into the annular chamber to pass longitudinally within said chamber with a spiral movement, apertured screens surrounding the tube so that the fluid within the annular chamber will pass through the screens to the tube and deposit the liquid upon the screens, and an outer apertured screen lining the inner wall of the drum and forming a surface through which the liquid may pass as it is deposited upon the same.

6. A separator for removing liquid from gaseous fluid, comprising in combination, an upright drum, a tube mounted within the drum to form an annular chamber within the drum and having apertures along its length for the passage of fluid therethrough, means for delivering the gaseous fluid to be treated tangentially into the annular chamber to pass lengthwise therein with a spiral movement, an apertured screen lining the outer wall of said chamber for the deposit of liquid thereupon, and an apertured screen surrounding the tube in spaced relation thereto so that the fluid within the annular chamber will pass through the screen to the tube and deposit the liquid upon the screen.

7. A separator for removing liquid from gaseous fluid, comprising in combination, an upright drum, a tube mounted centrally within the drum and having apertures therein along its length for the passage of fluid therethrough, a pair of apertured screens surrounding said tube and spaced to form an annular chamber between the screens, and means for delivering the fluid into the space between the screens to travel lengthwise thereof with a whirling movement to deposit liquid upon the screens and to pass inwardly through one screen and the apertures of the tube into the tube.

8. A separator for removing liquid from a gaseous fluid, comprising in combination, a container, a tube extending centrally within the container and having apertures along its length for the passage of fluid from the container into the tube, perforated plates surrounding said tube in spaced relation to each other and forming an annular chamber with smooth walls between the plates, lips upon each of the plates and extending away from the annular chamber, and means for delivering the gaseous fluid to be treated into the annular chamber with a whirling movement to deposit liquid upon said lips.

9. A separator for removing liquid from a gaseous fluid, comprising in combination, a container, a tube extending centrally within the container to conduct fluid from the container and forming an annular chamber between the drum and container, means for delivering the gaseous fluid to be treated into the annular chamber with a whirling movement, including a plurality of pipes leading from a conduit tangentially into the container at different points lengthwise of the container, and an apertured screen within the annular chamber and presenting a rough surface upon which the liquid in the fluid is deposited.

In testimony whereof, I have signed my name to this specification.

ALBERT H. STEBBINS.